United States Patent [19]

Pardoe et al.

[11] 3,781,818

[45] Dec. 25, 1973

[54] DATA BLOCK MULTIPLEXING SYSTEM

[75] Inventors: Carroll T. Pardoe, Woodbine; Alvar G. Carlton, Silver Spring; Robert L. Appel, Rockville, all of Md.

[73] Assignee: The Johns Hopkins University, Baltimore, Md.

[22] Filed: May 8, 1972

[21] Appl. No.: 250,901

[52] U.S. Cl. .......... 340/172.5, 179/15 BV

[51] Int. Cl. .......... H04j 3/16

[58] Field of Search .......... 179/15 BA, 15 BV, 179/15 A, 15 AF, 15 BS, 15 BY; 178/50, 69.5 R; 325/4; 340/172.5

[56] References Cited

UNITED STATES PATENTS

| | | | |
|---|---|---|---|
| 3,713,106 | 1/1973 | Monte | 340/172.5 |
| 3,636,524 | 1/1972 | Holland | 340/172.5 |
| 3,668,645 | 6/1972 | Reymond | 340/172.5 |
| 3,387,086 | 6/1968 | Beresin | 178/50 |
| 3,461,245 | 8/1969 | Johannes | 179/15 AF |
| 3,471,646 | 10/1969 | Magnuski | 178/50 |
| 3,504,287 | 3/1970 | Deregnaucourt | 325/38 R |
| 3,541,524 | 11/1970 | Blasbalg | 340/172.5 |
| 3,575,557 | 4/1971 | McCowen | 179/15 AF |

*Primary Examiner*—Ralph D. Blakeslee
*Attorney*—John S. Lacey et al.

[57] ABSTRACT

A time-division multiplexing system capable of combining the asynchronous data bit streams from a plurality of independent input data sources and outputting the data as a single, higher rate bit stream is disclosed. The data from each input source is temporarily stored at its own clock rate until a block of data comprising a predetermined number of bits becomes available for a particular input source. When this occurs, the data is outputted, as a block, with a source identifying code label appended to permit proper demultiplexing at the reception station. During periods when no input channel has sufficient data to be processed, the multiplexing system switches to an operating condition wherein useful overhead data; e.g., coding check bits or low priority data, are outputted.

40 Claims, 10 Drawing Figures

FORMAT OF SYNCHRONIZATION BLOCK

FORMAT OF DATA SOURCE BLOCK

EXAMPLE OF COMPOSITE BIT STREAM TRANSMITTED BY MULTIPLEXER

FLOW DIAGRAM OF TIME-DIVISION DEMULTIPLEXER

DATA BLOCK MULTIPLEXING SYSTEM

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

In prior art systems, multiplexing is normally accomplished by interlacing individual bits or at most a small number of bits from each data source in a prescribed sequence. If the various data sources are at rates which are integer multiples of one another and are subject to very small variations in frequency, the previously proposed multiplexers are entirely reasonable. On the other hand, where the data bit streams originate from asynchronous data sources as is typical for space communications, the prior art methods of multiplexing are incapable of performing effective multiplexing, except at the expense of unreasonable complexity and expense. More specifically, when synchronism is not a characteristic of the input signal sources, considerable effort must be taken to avoid the ambiguity that occurs when an input signal changes state while it is being handled, and this problem is compounded if the input rates are subject to reasonably large variations around their nominal value (such variation is typically as much as ± 10 percent of the nominal rate for space telemetry).

DESCRIPTION OF THE INVENTION

The proposed multiplexing method and apparatus of the present invention represents a substantial improvement over these prior art multiplexers in that the proposed multiplexing method and apparatus are not limited to use with precisely controlled input data bit rates and can, in fact, handle burst type inputs which are virtually impossible to process with the so-called bit stuffer and character interlace types of prior art multiplexing systems previously discussed. Moreover, no known prior art multiplexing methods and apparatus utilize available system operating time, in excess of that required for handling input data, to convey useful overhead information to the receiving station.

Generally speaking, it is proposed in accordance with the present invention that the data from the various input data sources be shifted into the multiplexer by their own clock signal and be temporarily stored in one of two input registers associated with each data source, until a block of data comprising a predetermined number of data bits has been accumulated. Each time a block of data is accumulated, it is then transferred, at a clock rate much higher than the clock rate for any input data source, to a second level of storage and subsequently transmitted by a high speed data communication link to the receiving station(s) where the data blocks are demultiplexed. In this way, the data sources are multiplexed as blocks of information or data rather than bit-by-bit. Moreover, since the data are shifted into the multiplexer by its own clock signal, data rate variations have substantially no effect on the operation of the system. In fact, as noted earlier, even burst type telemetry could easily be accommodated in accordance with the present invention.

In order to permit demultiplexing of the data at the reception station, it is further proposed in accordance with the present invention that a unique label or bit pattern be added to each data block, while it is being processed at the multiplexer, to uniquely identify the source of that data block. In addition, it is proposed in accordance with the present invention that any excess capability of the high speed data communication link be monitored so that when input source data is not being transmitted, the multiplexer of the present invention will automatically switch or transfer to an operating condition wherein useful overhead data; e.g., coding check bits or low priority data, are made available for transmission to the receiving station.

In view of the foregoing, one object of the present invention is to provide a time-division multiplexing method and apparatus capable of combining the asynchronous data bit streams from a plurality of independent input data sources and outputting the data as a single higher rate bit stream.

A further object of the present invention is to provide a data block multiplexing method and apparatus capable of multiplexing input data from a plurality of asynchronous data sources from which the input data bit rates need not be precisely controlled integer multiples of one another.

A further object of the present invention is to provide an improved time-division multiplexing system wherein system capacity in excess of that required for handling the input data from the connected data sources is utilized to convey useful overhead information, such as coding check bits, to the receiving station.

Another object of the present invention is to provide a method and apparatus capable of performing data block multiplexing of a plurality of input data sources, said data block multiplexer method and apparatus including provision for labelling each data block being processed with code bits uniquely identifying the source of each data block.

Another object of the present invention is to provide a data block multiplexing method and apparatus wherein input data from each of a plurality of data sources are temporarily stored at the clock rate associated with that source, and subsequently transferred, as a data block, at a higher clock rate to a second level of storage from which each data block is extracted according to a predetermined sequence and transmitted via a connected high speed data communications link.

Another object of the present invention is to provide a data block multiplexing method and apparatus wherein input data from each of a plurality of data sources are temporarily stored until a block of data is accumulated for a particular source and then transferred, as a data block, to a second level of storage and wherein the transfer of data blocks from temporary storage to the second level of storage is controlled according to a selected sequence.

A further object of this invention is to provide a data block multiplexer of the type described wherein provision is made to insert periodic synchronization information into the multiplexer output, if desired.

Other objects, purposes and characteristic features of the present invention will in part be pointed out as the description of the present invention progresses and in part be obvious from the accompanying drawings, wherein.

The proposed data block multiplexing method and apparatus has application in any system wherein it is necessary to transfer digital information from a plurality of independent data sources, each having an associated clock signal, over a single transmission channel. As an illustrated embodiment, FIG. 1 of the drawings shows a generalized communications system employing time-division multiplexing/demultiplexing for communicating data from a plurality of independent (or dependent) digital information transmission sources designated as 10*a*, 10*b* . . . 10*n*, over a single communications link to a receiving station. These could be sources of information of such diverse types as voice, data, television, etc. The digital data from each of the sources 10*a* through 10*n* are shown as being applied to an associated receiver and demodulator unit 11*a* through 11*n*, of any conventional design, which functions to remove the carrier frequency signal from each data transmission and to output what is typically referred to as the video or baseband signal; i.e., the digital information signal in its rawest form. This video or baseband signal output from the receiver/demodulator units 11*a* through 11*n* are then applied to so-called bit synchronizers 12*a* through 12*n*, also of conventional design.

Each bit synchronizer is preset, either manually and/or by computer control in accordance with the known clock rate of the associated information transmission source and has three functions; namely, (1) to synchronize its internally generated clock with the transitions of the incoming baseband signal, (2) to adjust its clock frequency to allow for frequency variations in the associated input baseband signal, and (3) to produce a standardized level output that is representative of the original modulating signal at the associated transmission source. As a result, each bit synchronizer 12*a* through 12*n* produces two output signals, one of which is the standardized level output commonly referred to as the data signal (represented in FIG. 1 by the designation DATA), and the other of which is a regenerated clock signal (designated CLOCK in FIG. 1) corresponding approximately to the clock signal at the associated transmission source.

Figure 1:
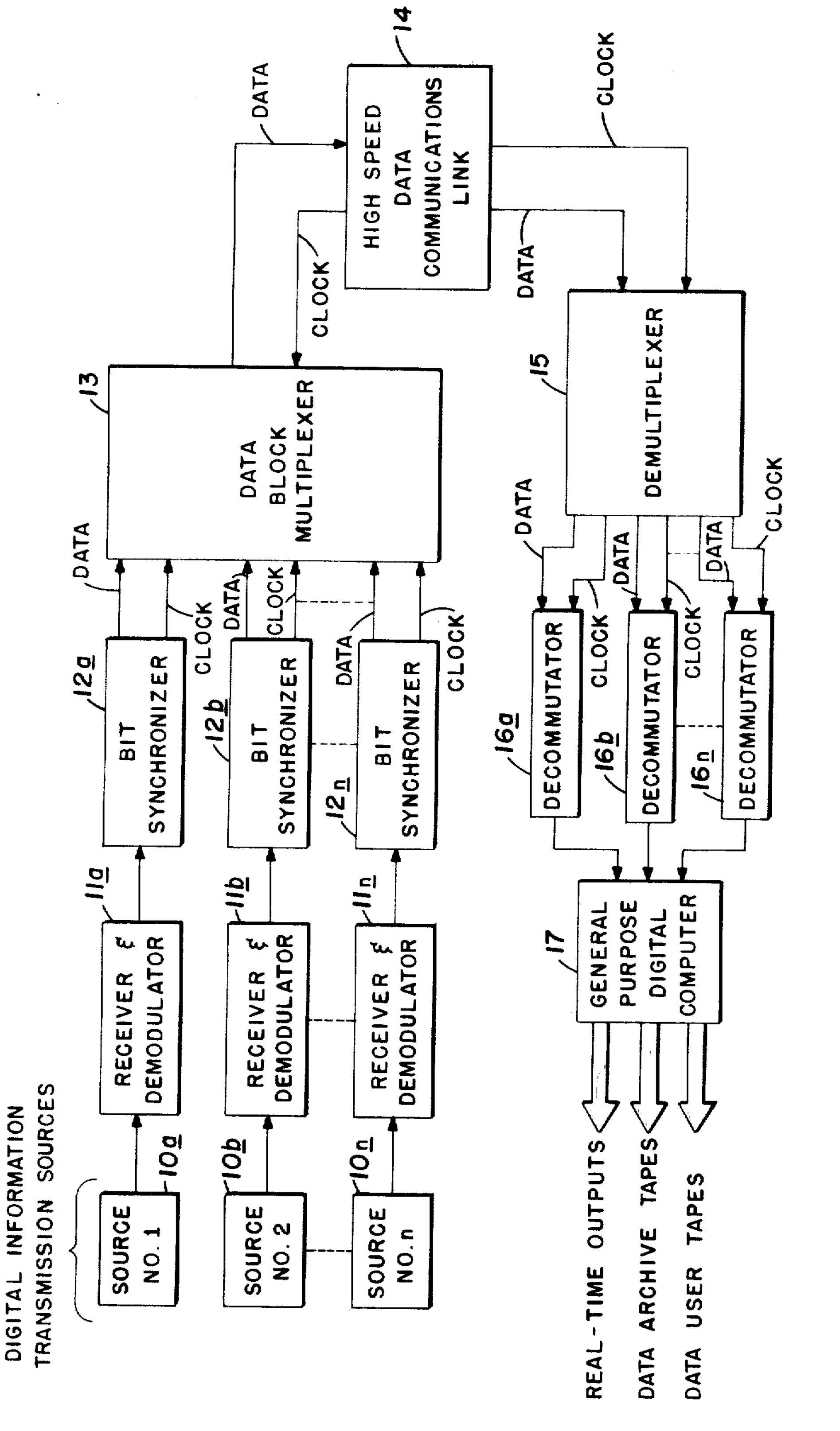
FIG. 1 is a block diagram of an over-all multiplexer/-demultiplexer system incorporating the data block multiplexing method and apparatus of the present invention.

This output DATA/CLOCK signal pair produced by each of the bit synchronizers illustrated in FIG. 1 are applied as input to, and represent an independent input data source for, the proposed data block multiplexer 13. As will be described in more detail hereinafter, the block multiplexer 13 functions to combine the data from these independent input data sources, even where such data are asynchronous relative to one another, and to output the data as a single, higher rate bit stream. As noted hereinabove, this multiplexing is accomplished by temporarily storing the input data from each input source until a block of data comprising a predetermined number of bits becomes available for a particular input source. When this occurs, the data is outputted, as a block, with a source identifying code label appended to permit proper demultiplexing at the reception point or station. Moreover, during periods when no multiplexer input channel has sufficient data to be processed, the multiplexer switches to an operating condition wherein useful overhead data, such as coding check bits or low priority data, are outputted.

It should be understood at this time that the present invention is not limited to the communications application illustrated in FIG. 1. Rather, the proposed data block multiplexer has general application in any system that can provide a plurality of such DATA/CLOCK signal pairs. By way of example, the proposed multiplexer can also be used at the input and/or output of a general-purpose digital computer to multiplex signals to and from peripheral equipments.

A high speed data communications link 14 is utilized to transmit information between the output of data block multiplexer 13 and the illustrated receiving apparatus, including demultiplexer 15. This high speed data communications link contains the usual high speed modem equipment, of any suitable design, which maintains exact synchronism between the output clock rate for the multiplexer 13 and the input clock rate for the demultiplexer 15. This high speed data communication link 14 might, for example, take the form of: the so-called INTELSAT system or a similar communications satellite system; a normal overland RF communication link; or, a telephone link. Typical clock rates for the high speed communications link 14 might be, for example, 2.4 kbps (kilobits per second), 4.8 kbps, 40.8 kbps, and 396 kbps, depending on the type of communications link employed.

At the demultiplexer unit 15, the input data and clock signals received over the high speed data communications link 14 are demultiplexed, according to a mode of operation dictated essentially by the design of the data clock multiplexing unit 13, and are outputted as (*n*) data/clock signal pairs, each of which is applied to an associated decommutator 16*a* through 16*n*. These decommutators are also of conventional design, dictated by the type of digital information transmission source employed at 10*a* through 10*n*, and each performs a so-called frame synchronization operation and provides independent sample value outputs which, in the drawings, are shown as being inputted to a general-purpose digital computer 17 such as, for example, a Univac 642-B. The computer 17 processes the input data into a desired final form and generates certain outputs, such as the illustrated real-time outputs, data archive tapes and data user tapes of FIG. 1. Other forms of output data can, of course, be generated by the computer, as is well-known to those skilled in the art.

Figure 2:
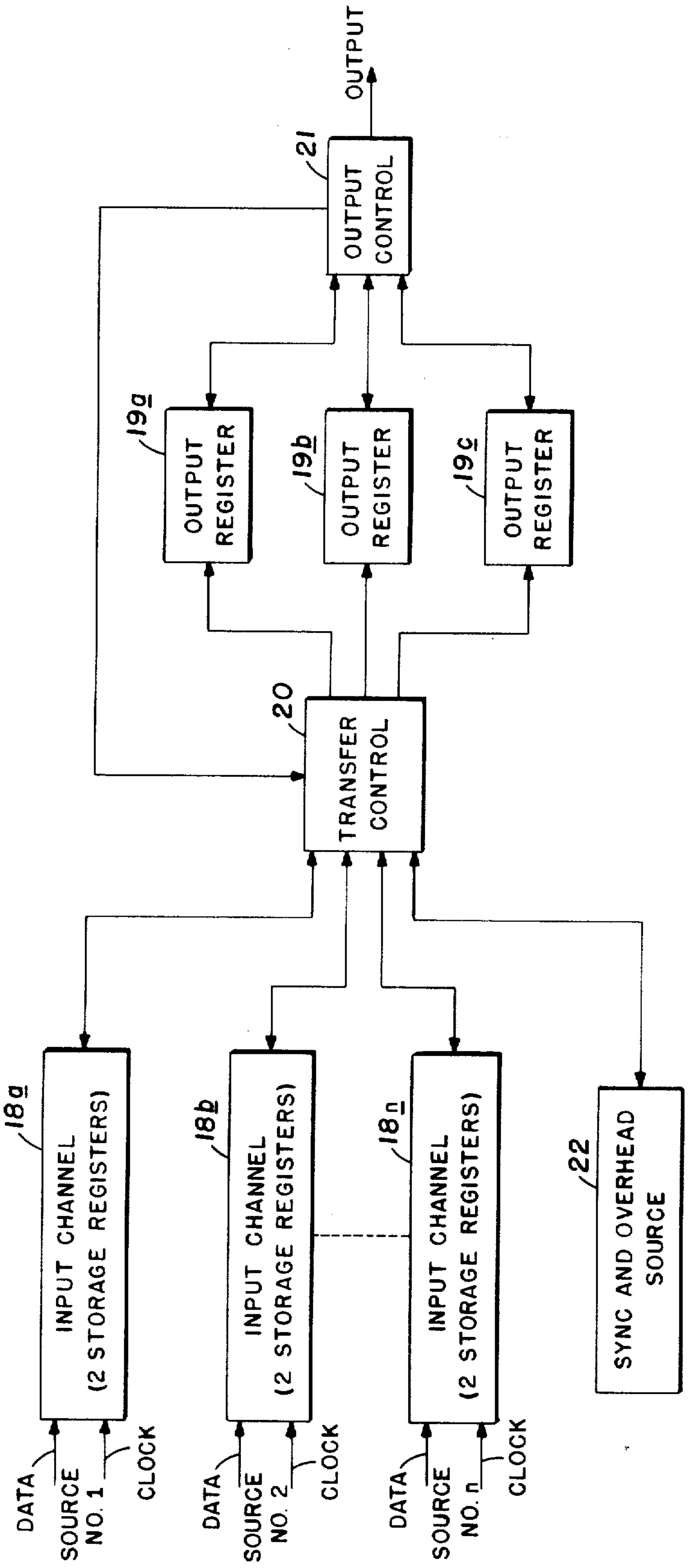
FIG. 2 is a general block diagram of the data block multiplexer portion of the multiplexer/demultiplexer system of FIG. 1 for processing the data from a plurality (*n*) independent data sources in accordance with the proposed multiplexing method and apparatus of the present invention.

A generalized block diagram of one embodiment of the data block multiplexer proposed in accordance with the present invention is shown in FIG. 2 of the drawings. More specifically, this illustrated multiplexer embodiment includes one input channel designated 18$a$ through 18$n$ for each of the ($n$) input data sources to be handled by the proposed multiplexing system. As shown, each input channel contains two storage registers, each having a storage capacity of D-bits corresponding to the preselected data block length for the multiplexing system. During operation of the multiplexer, incoming data from each data source is stored in one of the two storage registers available to that data source, at the clock rate associated with that data source. By then counting modulo the storage register length (D-bits in the illustrated embodiment), it is possible to recognize when a particular storage register for a given data source has been filled so that the storage register may then be emptied as output, while incoming information from that same is being stored in the other register of the associated register pair. In the illustrated embodiment of the present invention, three output storage registers 19$a$, 19$b$ and 19$c$ constitute a second level of storage for the data; the exact number of storage registers employed in the multiplexer output may vary of course, depending upon the requirements of practice.

The function of the illustrated transfer control unit 20 of FIG. 2 is to recognize when an input channel has a full storage register and, under the proper conditions to be described hereinafter, is ready for transfer (with an appropriate source identifying label appended thereto) into the next available output storage register 19$a$ through 19$c$. By means of output control unit 21 the output registers 19$a$ through 19$c$ are cycled in order to sequentially shift data out of each and on to the high speed data communications link 14, at the output clock rate generated by the modem equipment of the communications link 14.

When a condition arises wherein no input channel has a storage register filled at a time when data are required by the output, the necessary "filler" information is provided by a synchronization and overhead data source designated at 22 in FIG. 2. Since in data block multiplexing this condition persists for a complete block of bits, rather than occurring as pseudo-random bits as it does in bit stuffing, some use can be made of this otherwise wasted transmission channel capacity. If nothing else, at least synchronization information can be transmitted so that the demultiplexer 15 can verify its synchronism at frequent, although aperiodic, intervals. Such functions are station operating parameters or even non-real time telemetry, if properly prepared, could also be sent to a processing facility via this overhead data source 22.

Figure 3:
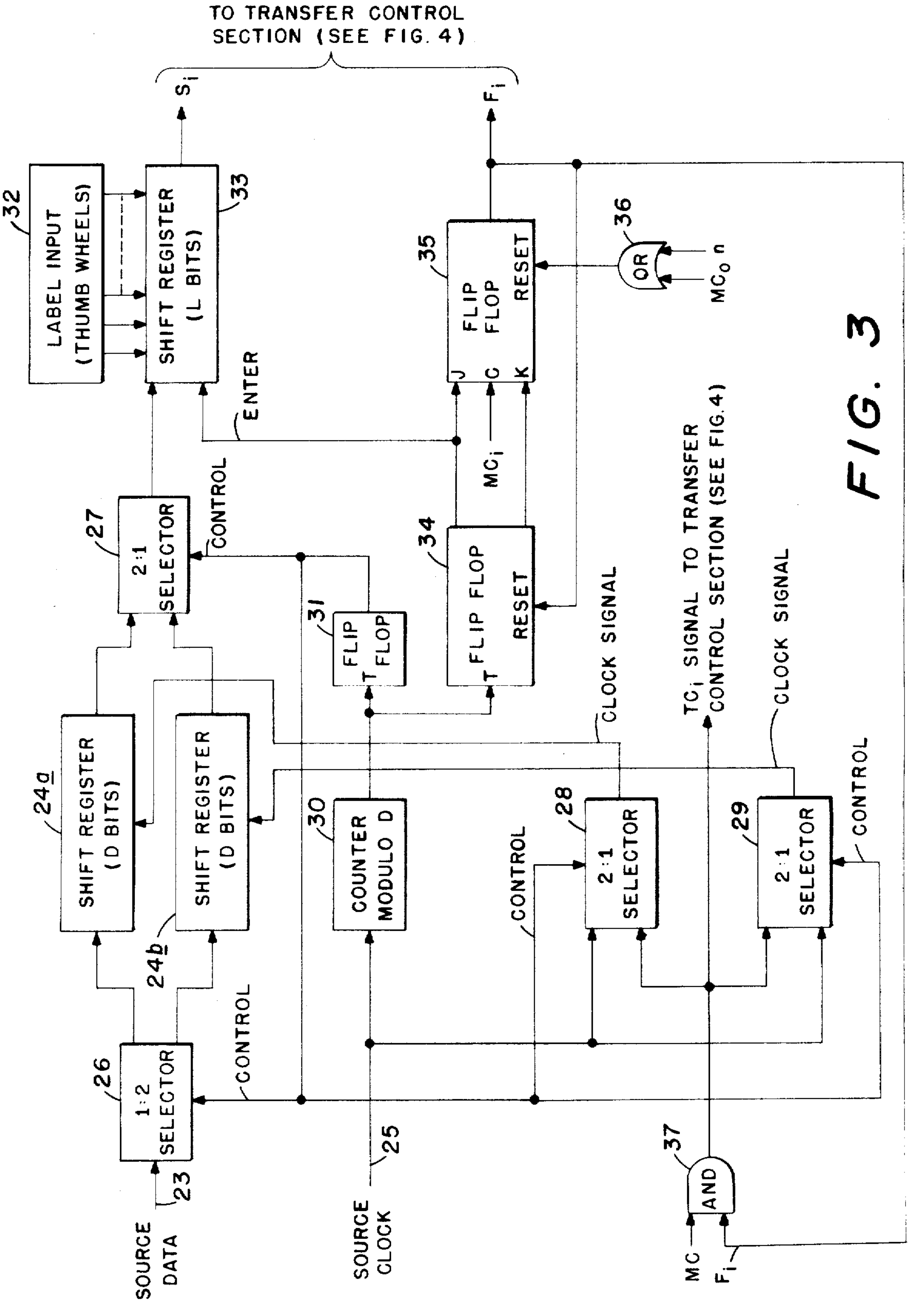
FIG. 3 is a more detailed block diagram of a typical input channel utilized in the data block multiplexer of FIG. 2.

The logical flow of information for a typical input channel is shown in FIG. 3 of the drawings. The input DATA bits appearing on line 23 from a particular data source (see FIG. 1) are entered into either shift register 24$a$ or 24$b$ of the associated input channel at the clock rate incoming on line 25 from that same source. Selection of shift register 24$a$ or 24$b$ for temporarily storing the input data is accomplished by one-to-two input selector circuit 26, of any suitable design; whereas, read out or emptying of this typical shift register pair is controlled through a similar two-to-one output selector circuit 27. The input clocking or shift rate for the shift register pair 24$a$–24$b$, as well as the output transfer clock rate therefor, are derived by means of two-to-one selector circuits 28 and 29, from respectively the input clock signal appearing on line 25 and an internal high speed master clock MC to be described hereinafter.

All of the selector circuits 26, 27, 28 and 29 for a single input channel are under the control of a single bistable element that changes state after each (D) transitions, in one direction, of the clock signal from the associated input data source. More specifically, the input data clock rate appearing on line 25 is applied to a counter 30 whose counting modulus is D-bits and whose output is applied to the toggle or trigger input of a flip-flop circuit 31, so that the flip-flop 31 produces an output control pulse signal each time the input clock signal has undergone (D) transitions. It is this output signal from the flip-flop 31 which is utilized to control the selector circuits 26, 27, 28 and 29. In particular, the selectors 26, under the control of the flip-flop 31, alternately connects the shift registers 24$a$ and 24$b$ to receive the input data, at the data source clock rate appearing at the outputs of two-to-one selectors 28 and 29; whereas, the two-to-one selector network 27 functions to alternately empty the filled shift register of the pair 24$a$ and 24$b$, as the other shift register in this pair is being filled with input data if present, at a high speed transfer clock rate determined by the block of transfer clock pulses alternately appearing at the outputs of selectors 28 and 29.

As noted earlier, the proposed multiplexer of the present invention includes provision for inserting a source identifying label to the input digital data so that correct demultiplexing may be accomplished. In the typical input channel shown in FIG. 3, this source identifying label is in the form of an additional L-bits which are added to each block of data through the use of binary-coded-octal thumb-wheel switches, designated at 32, which function to generate the correct inputs to a parallel input shift register 33. Obviously, other means of providing the desired source identifying label input could also be utilized.

This label information is entered into the system and added to the data block of bits immediately after completely filling an input buffer or shift register (e.g., 24$a$ or 24$b$) and is not released until just prior to transferring the entire (L + D) bits to an available output register 19$a$, 19$b$ or 19$c$ (see FIG. 2). More specifically, the entering of the source identifying label from the thumbwheels 32 into the shift register 33 at the proper time is accomplished by utilizing the output of the counter 30 (which indicates when an input storage register 24$a$ or 24$b$ is filled) to toggle a flip-flop 34 and thereby generate the illustrated ENTER control for the shift register 33.

The remaining input channel logic illustrated in FIG. 3 is utilized to establish a so-called fill command signal, designated $F_i$. The presence of the associated $F_i$ signal in the "true" state indicates that an input register 24$a$ or 24$b$ has been filled with input data, that a periodic synchronization data block is not required (as indicated by the absence of signal, $n$, to be described in more detail hereinafter), and that this input channel has been selected for transfer of data to an output buffer or storage register 19*a* through 19*c* (as indicated by the presence of the associated strobing signal $MC_i$).

More specifically, the input channels are sequentially strobed by this $MC_i$ signal in order to avoid the simultaneous occurrence of the $F_i$ signal for more than one channel, since this would result in an ambiguous decision. Each application of this $MC_i$ signal, derived from an internally generated master clock to be described, occupys a distinct and unique time position; i.e., the $MC_i + 1$ signal has a duration of one-half the master clock period and occurs one-half a master clock period after the termination of preceeding strobing signal $MC_i$. The $MC_i$ signal also provides the necessary priority for any data input source with a clock rate greater than one-half the output rate, providing that this source is connected as the first or No. 1 source, as will be described. As shown in FIG. 3, the above-mentioned $F_i$ signal for each input channel is generated by a bistable device (e.g., flip-flop) designated at 35, upon the occurrence of the associated strobing signal $MC_i$ and further contingent upon there being a full input register 24*a* or 24*b* in that input channel (as indicated by the output of flip-flop 34) and upon the OR gate 36 not producing a reset output to the flip-flop 35 as occurs, for example, when a periodic synchronization block is required; i.e., the signal (*n*) is present.

As previously noted, each input channel includes a pair of two-to-one selector circuits 28 and 29 which function, under the control of the flip-flop 31, to generate the clocking signal for the input storage registers 24*a* and 24*b* respectively. More specifically, when input data is being shifted into one of these registers 24*a* or 24*b*, the associated two-to-one selector circuit 28 or 29 outputs a clocking signal for that shift register at the input clock rate (appearing on line 25) from the connected data source. On the other hand, when either of the shift registers 24*a* or 24*b* is selected to output its stored data, the associated selector 28 or 29 is concurrently actuated to output a clocking signal that is at the much faster transfer clocking rate dictated by the internally generated master clock signal MC. This transfer clock signal is designated as $TC_i$ in FIG. 3 and is generated within the input channel by AND gating, at 37, the master clock signal MC (e.g., a one megahertz clock generated at source 38 in FIG. 4) with the appropriate $F_i$ signal which, as noted earlier, is produced when an input shift register 24*a* or 24*b* for that input channel has been filled.

Figure 4:
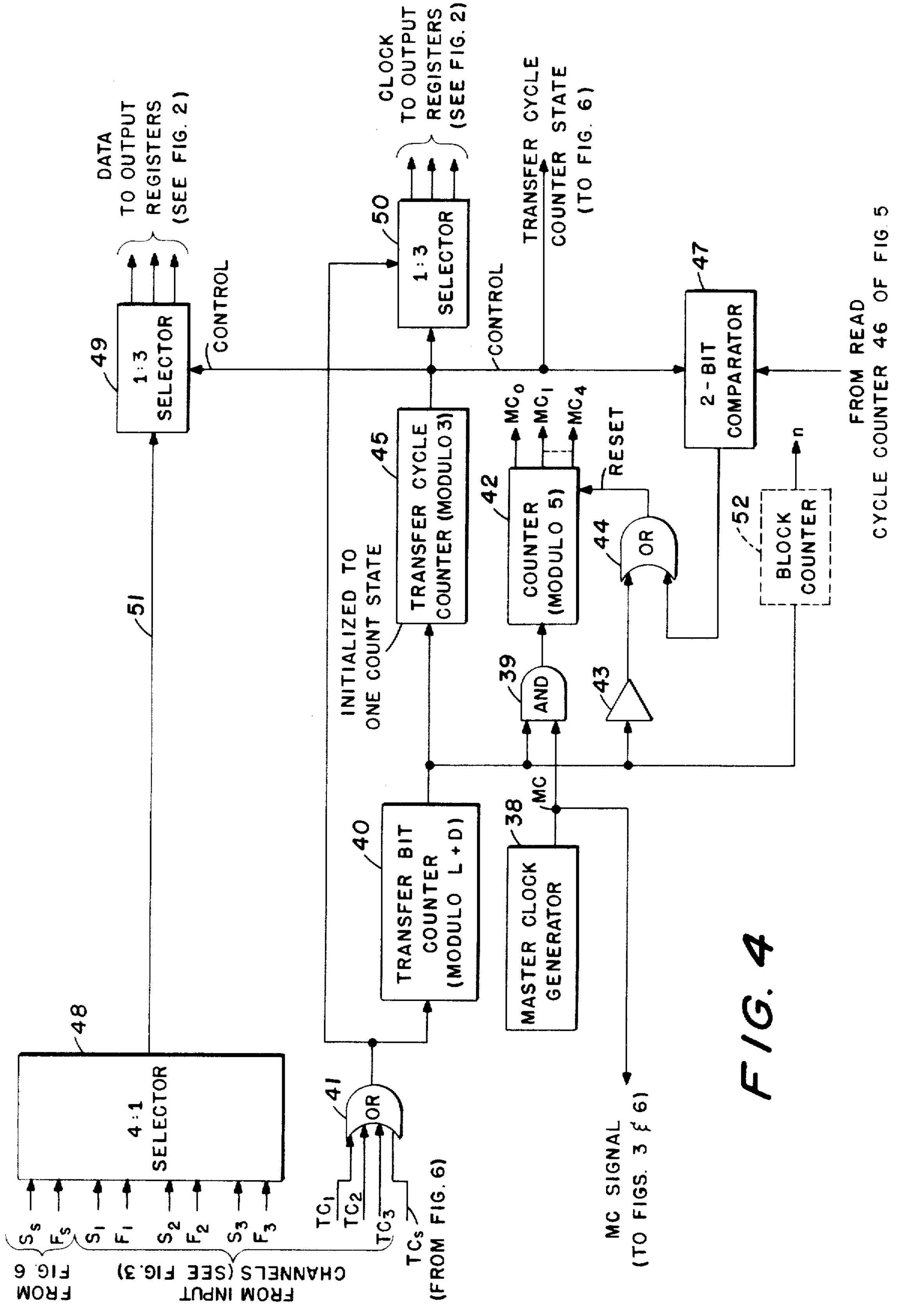
FIG. 4 is a more detailed block diagram of the transfer control portion of the data block multiplexer embodiment of FIG. 2.

The transfer control portion of the proposed data block multiplexer is generally designated at 20 in FIG. 2 and is shown in more detail in FIG. 4 of the drawings. As noted previously, the major purpose of the transfer control section is to recognize that an input channel has a full shift register and, under the proper conditions, to transfer the contents of that register to the next available output storage register 19*a*, 19*b* or 19*c*. Moreover, in order to ease rate restrictions for the input data sources, this transferring of the data within the multiplexer is done at the high (e.g., one megahertz) clock rate $TC_i$ derived from the master clock signal being generated at 38 in FIG. 4.

The master clock output from the generator 38 is also utilized, as will now be described, to generate the strobing signals $MC_i$ which function to assure that only the data from one input channel can be transferred at a time and that the data from a high rate source will be given priority over sources of a lower clocking rate. More particularly, the master clock signal MC is applied to an AND gate 39, along with the outputs of a transfer bit counter 40 whose counting modulus is (L + D) bits. This transfer bit counter 40 receives its input from an OR gate 41 connected to receive the transfer clock signals TC generated within each input channel (three input channels are assumed) and within the synchronization and overhead source section designated at 22 in FIG. 2 and to be described in more detail hereinafter. As a result, the counter 40 produces an output enabling signal to the AND gate 39 each time the transfer control section completes transfer of a data block with appended source identifying label; i.e., (L + D) bits, to an output regiater. Consequently, the output of the AND gate 39 enables the input to a modulo five counter 42 and, in the illustrated embodiment, five sequential strobing $MC_i$ pulses (designated $MC_0$, $MC_1$, . . . $MC_4$ in FIG. 4) are generated at the master clock rate. The first or $MC_0$ pulse is applied to the OR gate 36 of each input channel (see FIG. 3) and to the synchronization and overhead source section of FIG. 6, and operates to reset to zero all of the flip-flops (e.g., flip-flop 35 in FIG. 3) which are utilized for generating the illustrated $F_i$ signal and, in particular, the one $F_i$ signal that has been in a true state during the transfer of data just completed. The next or $MC_1$ pulse produced at counter 42 is applied to and strobes the conditions for setting the $F_i$ generating flip-flop (e.g., flip-flop 35) for the first input channel. If all conditions are met; namely, there is a full input register within this first channel and no periodic synchronization block is required (signal *n* absent), the $F_i$ signal will be set for that channel; its data with source identifying label appended thereto (represented as $S_i$ in FIG. 3) will be transferred; and, no further $MC_i$ pulses will be generated. This last function is accomplished by applying the output of the transfer bit counter 40 through amplifier 43 and OR gate 44 to reset input of the counter 42.

On the other hand, if an input storage register is not in a filled condition within the first or number one input channel when the strobing $MC_1$ pulse occurs, the $F_i$ signal will not be generated in that channel, and a $MC_2$ pulse will be produced by the counter 42 to subsequently strobe the conditions in channel 2. Similarly, if there is no filled input register in the second or No. 2 input channel, the next strobing pulse $MC_3$ will be generated and would strobe the conditions for the third input channel, and so on. When no input channel has data to be transferred and an output register (19*a*, 19*b* or 19*c*) is detected as being empty during read out onto the communications link 14, as will be described later, the $MC_4$ strobing pulse is generated and causes synchronization and overhead source data to be entered into this available output register in a manner to be described in more detail hereinafter when discussing the apparatus shown in FIG. 6 of the drawings.

From the foregoing description it will be noted that each time a block of input data with appended label is transferred to an output register, the transfer control section of FIG. 4 operates to revert to a strobing wherein the first or No. 1 channel is initially strobed to see if it contains a full input shift register. Consequently, the processing of high priority data can readily be accomplished with the proposed multiplexer of the present invention by merely assigning this high priority data to the No. 1 channel. Similarly, input data sources of descending priority can be processed by connecting them appropriately to the remaining input channels of the multiplexer. At this time, it should be noted that the transfer control portion of the illustrated multiplexer embodiment has been shown as being adapted to process the input data from three data sources plus the synchronization and overhead source 22; i.e., only three input channels are assumed in the illustration of FIG. 4. It should be quite obvious that the number of input data sources capable of being processed, in practice, is not limited to three and that the operating capability of the transfer control portion can readily be expanded to accommodate any desired number of input data sources by merely increasing the counting capability of the counter 42 and the selecting capability of the selector 48 accordingly.

The output of the transfer bit counter 40 (modulo L + D) is connected to and controls a transfer cycle counter 45 whose counting modulus is three corresponding to the number of output register employed. The purpose of the transfer cycle counter 45 is to assure proper transfer of the data blocks (and transfer clock) to the output storage registers 19*a* through 19*c*, as will be described shortly. Similarly, the output control section shown in detail in FIG. 5 includes a modulo three counter designated as the read cycle counter 46 which functions to assure proper transfer of the data blocks from the output registers 19*a* through 19*c* to the high speed communications link 14 and the inputting of the clocking signal from the high speed modem equipment in the link 14 to control the read out rate from these output registers, as will also be described in more detail hereinafter.

A two-bit comparator network 47, of any suitable design, is provided in the transfer control section of FIG. 4 to prevent the transfer of information from an input register to an output register when that output register still contains data from a previous transfer. More specifically, the comparator 47 receives an input from each of the transfer cycle counter 45 and the read cycle counter 46. When these counter states are identical, the comparator 47 produces an output to the OR gate 44 and thereby functions to hold the modulo five counter 42 in a reset condition and thereby prevent the generation of the strobing $MC_i$ pulses. However, once the output register is emptied, this reset signal is removed and the generation of the strobing pulses can be resumed.

As shown in FIG. 4, the proper routing of information from an input channel to a selected output register is accomplished, in the illustrated embodiment, by a four-to-one selector circuit 48 followed by a one-to-three selector network 49 (which routes data) and a second one-to-three selector network 50 (to apply an input clocking signal) to the proper output register. The four-to-one selector 48 is essentially an AND-OR gate, of any conventional design, in which each of the $S_i$ output signals from the input channel (data block plus appended label) is gated with its corresponding $F_i$ signal so that a data bus line is formed, at 51, as input to the one-to-three selector network 49.

Both of the one-to-three selectors 49 and 50 are essentially triple AND gate functions in which the input to the proper output register has data or a clock signal applied to it under the illustrated control of the transfer cycle counter 45; i.e., dependent upon the counting state of the counter 45, the data (plus label) and appropriate clock signal ($TC_i$) is applied to a selected output register. It should be noted here that this clock signal will be available for transfer to the output register only if the associated $F_i$ signal has been generated, inasmuch as the transfer clock signal $TC_i$ is generated within an input channel by gating the master clock signal MC with the appropriate full signal $F_i$ for that channel.

The illustrated transfer control section of FIG. 4 may, if desired, include provision to accommodate the insertion of a periodic synchronization word into the transmitted data. By way of example, this can be accomplished by counting with block counter 52 (shown dotted), the number of blocks of data that are transferred and generating the signal ($n$) for the appropriate block. As noted earlier, this signal ($n$) would then be utilized (see FIG. 3) to inhibit the generation of the $F_i$ signal(s) for the input data channel(s) and would, instead, cause the strobing pulse ($MC_4$ in FIG. 4) associated with the synchronization and overhead source to initiate transfer of information from the synchronization and overhead source channel shown in FIG. 6 of the drawings, as will be described shortly.

It will be appreciated by those skilled in the art that synchronization patterns must be sent in the output bit stream in order to permit proper demultiplexing at the reception point. Moreover, the selected synchronization pattern must have good correlation properties to minimize the probability of false or erronous synchronization, in addition to being transmitted often enough to minimize the time from loss of synchronization to reacquisition. In the illustrated embodiment of the proposed block multiplexer, the source of such synchronization and overhead data is illustrated in FIG. 6 of the drawings.

Figure 5:
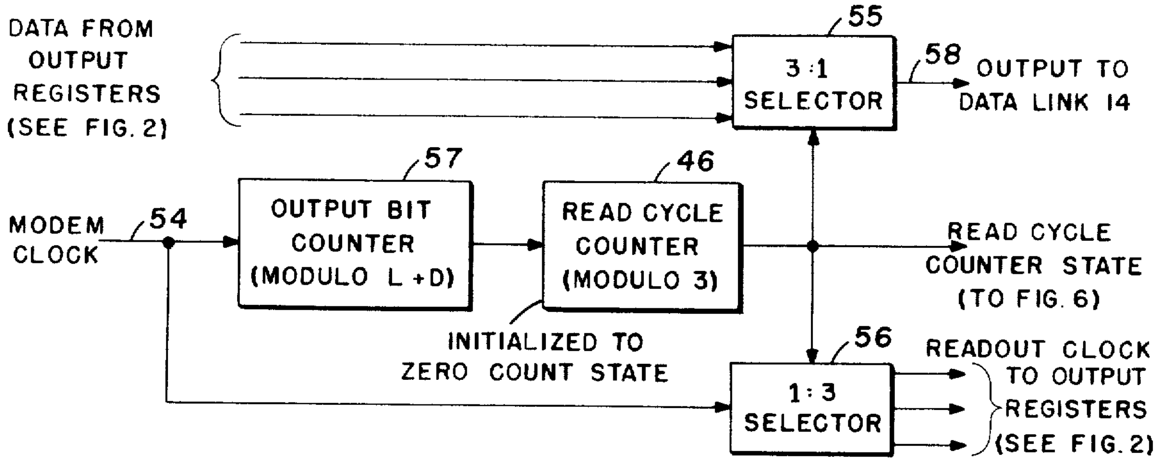
FIG. 5 is a detailed block diagram of that portion of the illustrated embodiment of FIG. 2 which provides synchronization and overhead data to the multiplexer system.
Figure 6:
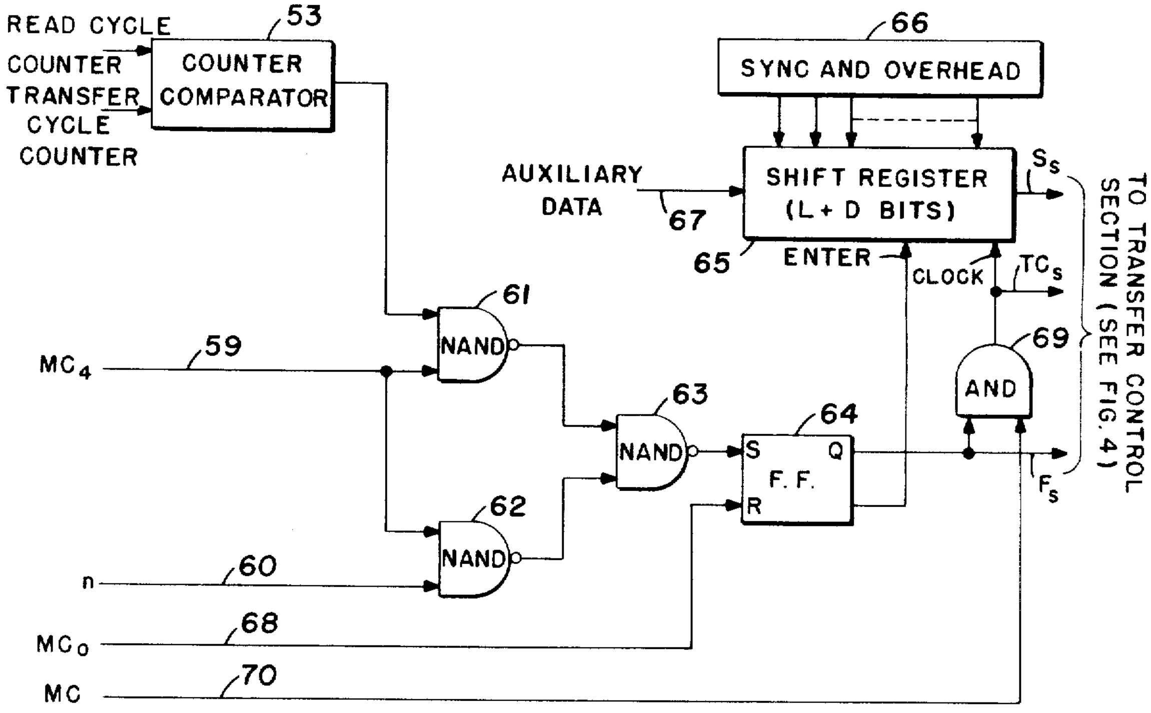
FIG. 6 is a detailed block diagram of the output control portion of the multiplexer embodiment shown in FIG. 2.

As noted earlier, the synchronization and overhead data source of FIG. 6 also operates to provide the desirable "filler" information when the condition arises wherein no data input channel has a storage register filled and data are required by the output. Moreover, since in block multiplexing this condition persists for a complete block of bits rather than occurring as pseudo-random bits as it does in bit-stuffing, some use can be made of this otherwise wasted transmission channel capacity. In the illustrated embodiment, the occurrence of such a condition permitting insertion of useful synchronization and overhead data; e.g., coding check bits, is detected by a comparison circuit designated as counter comparator 53 in FIG. 6 which compares the states of the read cycle counter 46 in the output control section (see FIG. 5) and the transfer cycle counter 45 contained in the transfer control section illustrated in FIG. 4. Whenever the transfer counter state is only one greater than the read cycle state, a command is given to transfer information from the synchronization and overhead source of FIG. 6 to an output register 19*a*, 19*b* or 19*c*, whichever is available.

As shown in FIG. 5, the clocking signal from the high speed modem equipment contained in the communications link 14 (see FIG. 1) is applied to the output control section of the multiplexer on input line 54 in FIG. 5 and is utilized to control the operation of a three-to-one selector 55 and one-to-three selector 56. More specifically, the high speed input clock at 54 is counted by the output bit counter 57 whose counting modulus is L + D and which thereby produces an output control signal to the selectors 55 and 56, via the read cycle counter 46, for each L + D clock pulses appearing at the input control line 54. As a result, the output shift registers 19*a*, 19*b* and 19*c* (see FIG. 2) are selectively connected to apply their stored block of data (with appended source identifying label) to the output line 58 leading to the high speed data communication link, at the clock rate of the high speed modem equipment. Thus, the one-to-three selector 56 selectively applies the clock signal on line 54 to read out the data block contents selectively from the filled output shift registers 19*a* through 19*c*.

While the data blocks are being read from the output storage registers and onto the high speed data communications link 14, the counter comparator 53 of FIG. 6 thus senses when an output storage register contains no data and no input channel register is then full; i.e., the state of transfer counter 45 is only one greater than the state of read cycle counter 46. Accordingly, when the strobing pulse $MC_4$ is sequentially produced by the counter 42 of FIG. 4, it is effective to set the $F_S$ control pulse and thereby initiate transfer of digital information from the synchronization and overhead source to the available output shift register.

More specifically, the strobing pulse $MC_4$ appears on line 59 in FIG. 6 and is applied, along with the output of the counter comparator 53 and the (*n*) control pulse appearing on line 60 from the block counter 52 of FIG. 4, to NAND gates 61 and 62 respectively. A third NAND gate 63 is connected to the outputs of the NAND gates 61 and 62 and thereby produces a high output state to the set input of flip-flop 64 only when conditions are proper for generating the $F_s$ fill signal; i.e., when the state of the transfer cycle counter 45 is only one greater than the state of the read cycle counter 46, the strobing pulse $MC_4$ is present and the control signal (*n*) has been generated to indicate that a periodic synchronization block is desired.

The synchronization and overhead source portion of the proposed block multiplexer shown in FIG. 6 includes a shift register 65 (storage length of L + D bits) which receives, as parallel inputs, synchronization and overhead input bits from a suitable generating source thereof, designated at 66. The source 66 can, for example, be in the form of thumbwheels similar to those employed to generate the source identifying label for the input data (see typical input channel of FIG. 3). The shift register 66 may, if desirable, also receive auxiliary data from any suitable source, as represented by the input control line 67. All of the input data to be stored on the shift register 64 can be entered, for example, whenever the flip-flop 64 is operated to its reset condition by the initial strobe pulse $MC_0$ which is generated at counter 42 and appears on control line 68 in FIG. 6.

An AND gate 69 is included in the synchronization and overhead source portion of the illustrated data block multiplexer embodiment for the purpose of providing an outpul clocking signal to the shift register 65, at the master clock pulse rate appearing on line 70, when the fill signal $F_s$ has been set. Moreover, the output clocking signal appearing from the AND gate 69 is applied as the signal $TC_s$ to the input of OR gate 41 (in the transfer control section of FIG. 4) and thereby controls proper transfer of the synchronization and overhead data from the shift register 65 to the available output storage register. As with the normal input data being processed by the multiplexer, the synchronization and overhead information appearing at the output of the shift register 65 (designated as signal $S_s$ in FIGS. 4 and 6) and the associated fill signal $F_s$ are applied to the four-to-one selector network 48 in the previously described transfer control portion of FIG. 4.

With reference to FIGS. 4 and 5 of the drawings, it will be noted that the output control section of FIG. 5 is quite similar to the transfer control section of FIG. 4. The major difference between these two sections is that in the output control section it is the output or read out clock signal (appearing on line 54 and generated by the modem equipment) which must be counted, rather than the transfer clock signals $TC_i$ and also that the control function in the output section is periodic and synchronous and, therefore, no strobing pulses are required.

At this time it should be noted that when the proposed multiplexer is first turned on, the transfer cycle counter 45 is initialized to a one count condition wherein it controls selectors 49 and 50 so as to connect the first output register (e.g., register 19*a* in FIG. 2) to receive input digital information; whereas, the read cycle counter 46 is initialized to a zero count condition. As a result, the counter comparator 53 is activated and a synchronization block is transferred to the first output register from the synchronization and overhead source of FIG. 6, as previously discussed, and counter 45 switches to its second count state. This synchronization block is then read out to the high speed data link at the modem clock rate input on line 54 when the read counter 46 subsequently changes from its zero count state (disconnected from the output registers) to the first or number one count state wherein it is connected to the just loaded or first output register.

After this initial synchronization block has thus been processed, the multiplexer resumes normal operation wherein the transfer cycle counter 45 advances its count once for each data or synchronization block transferred to an output register and the read cycle counter 46 advances its count each time the contents of an output register is read out to the data link 14. During this normal operation, the read cycle counter 46 is controlled in such a manner that it will not revert to its zero count condition, but instead will re-cycle from its last or number three count state directly to its first or number one count state, similar to the transfer cycle counter 45.

Figure 7:
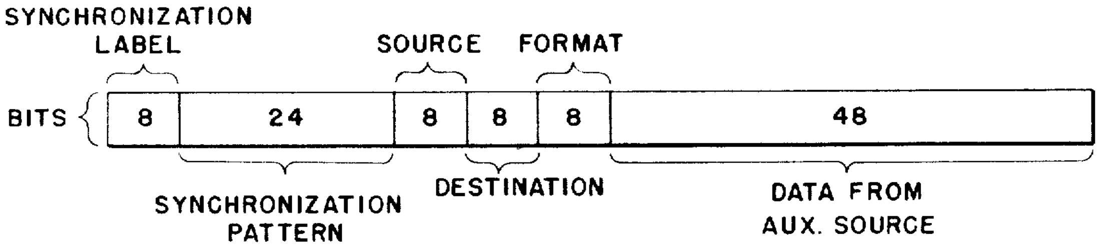
FIG. 7 is a diagrammatic illustration of one example of a synchronization block format capable of being employed in the multiplexer embodiment of FIG. 2.
Figure 8:
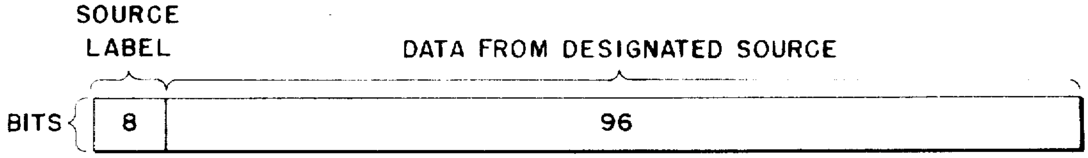
FIG. 8 is a diagrammatic illustration of a typical data block format employed in the multiplexer embodiment of FIG. 2.
Figure 9:
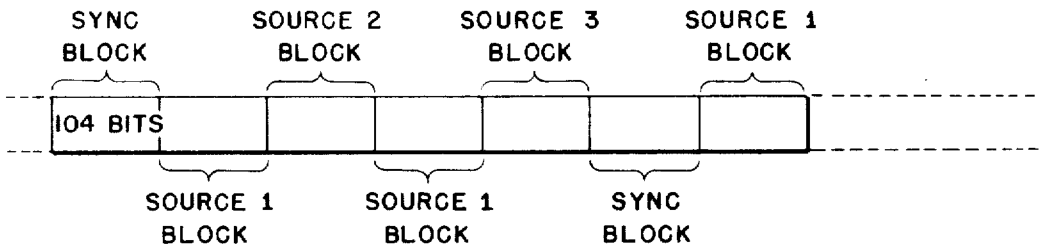
FIG. 9 is a diagrammatic illustration of one example of the composite bit stream transmitted by the multiplexer embodiment of FIG. 2.

The selection of the proper multiplexer output data format is important in that it dictates the design of the demultiplexer portion of the over-all multiplexer/-demultiplexer system shown in FIG. 1 and determines to a large extent the efficiency of utilization of output channel capacity. A suitable manner of output formatting the proposed multiplexer of the present invention is illustrated in FIGS. 7, 8 and 9 of the drawings. More specifically, FIG. 7 illustrates a typical format of a synchronization block at the output of the proposed multiplexer; FIG. 8 illustrates a typical format of an output data source block from the multiplexer; and, FIG. 9 illustrates a typical example of a composite bit stream transmitted by the multiplexing system of the present invention.

As is well-known to those skilled in the art, the selection of a block length for any form of transmission system generally involves a number of trade-offs. From an intuitive standpoint, the block should not be so short that overhead information is being sent too frequently and channel capacity is inefficiently utilized, nor so long that the delay time from reception to multiplexer output will become significant for low rate data. Moreover, with data block multiplexing, as proposed in accordance with the present invention, it is essential that the block labels be received by the demultiplexer correctly to protect against erroneously routing the data from one source to the output channel of another source.

By way of example, four labels or code words are required in the illustrated embodiment of the present invention to properly account for the three data sources and one synchronization source assumed in the block diagram of FIG. 4. To properly process these four messages, an 8-bit near-equidistant code was selected; an equidistant code being one for which the distances between pairs of code words are all equal to the maximum possible mean distance. By selecting the code word length to be eight bits, a minimum distance of five was obtained between the four required labels. This minimum distance allows the correction of up to two errors. Thus, three errors would have to be made in the eight bits of a label before invalid decoding of a label would occur.

Since the label length is considered overhead information and thus effects the efficiency of utilization of the output channel capacity, the block length of the proposed multiplexing system was chosen, in the illustrated embodiment, to be one hundred and four bits and therefore the overhead contributes less than 10 percent of the total block length. Moreover, this block length is reasonable in that a channel capacity utilization in excess of 90 percent may be obtained and the time delay from multiplexer input to output is kept rather small; e.g., for a 1 kbps data source and a 50 kbps output rate, the maximum time delay is approximately 100 milliseconds.

As shown in FIGS. 7 and 8, the block length for both the synchronization and data source blocks is selected, for the illustrated embodiment, to be 104 bits long so that all blocks would be of equal length. This not only simplifies the multiplexer hardware but also provides some additional flexibility. More specifically, the format of a typical synchronization block shown in FIG. 7 consists of an 8-bit synchronization label, the 24-bit synchronization pattern, three 8-bit words to indicate respectively the source, destination, and format of the data, and 48 bits that may contain additional housekeeping information or data from an auxiliary source (see FIG. 6). As shown in FIG. 8, the source identifying label utilized for the data source block is also 8 bits long, as previously discussed, and the data portion of the block makes up the remaining 96 bits. The diagram of FIG. 9 illustrates one example of a composite bit stream transmitted by the proposed multiplexer and containing both synchronization and data source blocks, all having a 104 bit length.

Figure 10:
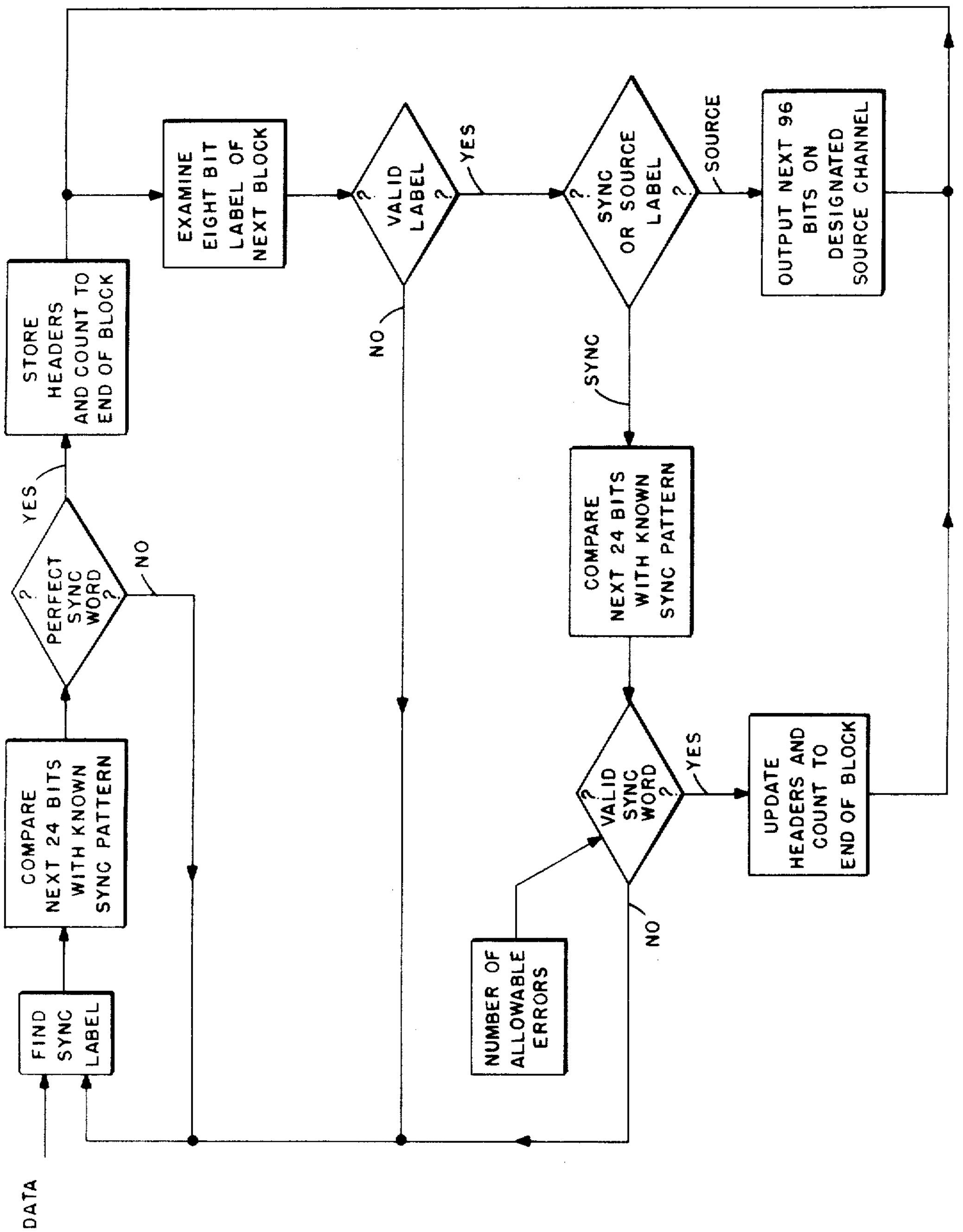
FIG. 10 is a flow diagram of the demultiplexer portion of the multiplexer/demultiplexer system of FIG. 1.

As previously discussed, the functions of the demultiplexer 15 in the over-all system of FIG. 1 are to establish block synchronization on this composite bit stream being transmitted by the multiplexer 13 and to separate the composite bit stream into the original data sources. Inasmuch as the design of the demultiplexer 15 is essentially dictated, as previously discussed, by the data block multiplexer itself, its operation has been illustrated in the drawings by the operational flow diagram of FIG. 10.

More specifically, the demultiplexer 15 is designed to search initially for the synchronization bit label (which might consist, for example, of seven "zeros" followed by a "one"); i.e., the composite input bit stream is examined bit-by-bit until a run of seven consecutive "zero" bits is found. The next "one" bit received activates a bit-by-bit serial comparison of the following 24 bits in the input data stream with the selected master synchronization pattern. If no errors are found in the received synchronization pattern, the demultiplexer 15 is considered to have established synchronization. On the other hand, upon reception of any bit that does not agree with the known synchronization pattern, the demultiplexer 15 is considered to have lost synchronization, and a bit-by-bit search for the synchronization label is resumed.

Assuming that a perfect 24-bit synchronization pattern has been verified, the demultiplexer 15 simply counts until the end of the synchronization block occurs; i.e., 96 bits after the initial synchronization label was found. If desired, the three 8-bit words following the synchronization pattern and representing the source, destination, and format for the data may be stored, along with the remaining 48 bits containing the additional housekeeping information or data from an auxiliary source.

After the demultiplexer 15 has completed its examination of the synchronization block, the next 8 bits in the data stream are examined to determine if the next block is another synchronization block or a data source block. If one of the three possible data source labels is found, the next 96 bits are data from that particular source, as shown in the data source block format of FIG. 8. The data bits are then routed to the proper output channel as dictated by the source label.

If, on the other hand, the next 8 bits were determined to be the synchronization label, the following 24 bits would again be compared to the known synchronization label. In this case, however, some number of disagreements may be tolerated; i.e., this allowable number of errors being switch selectable from 0 to 7, for example. Hence, a less stringent bit error rate criterion is allowed once a perfect synchronization pattern has been found. If the following 8 bits after the synchronization block contain too many errors and cannot be decoded as either a synchronization label or a label from one of the three data sources employed in the illustrated embodiment, synchronization is assumed to be lost, and the bit-by-bit search for the synchronization label and an error-free 24 bit synchronization pattern is again undertaken.

In the illustrated embodiment, the proposed data block multiplexer system of the present invention is capable of multiplexing up to three serial pulse-code modulation (PCM) bit streams and may be used for any non-return-to-zero (NRZ) coded data. In one practical application of the illustrated embodiment, the maximum output rate limitation for the multiplexer is 953 kbps, with a maximum single-channel input bit rate of 461 kbps. These limitations are imposed by the internal master clock rate of 1 Mbps and the input register configuration (see FIG. 3).

If an increased number of input channels is required; i.e., in excess of three channels, the most direct approach is simply to duplicate the equipment (both multiplexer and demultiplexer units) and connect two of each in a cascade arrangement. In this way, the number of inputs that can be accommodated is increased from three, for a single multiplexer unit, to five, for two cascaded units. A suitable clock rate would have to be provided to serve as the output clock from one multiplexer and the input clock for the second. On the other hand, input capacity expansion by cascading multiplexers does have the disadvantage of decreasing channel usage efficiency. This results from having to provide synchronization and block labeling information in the output of the first multiplexer and then similar type information again in the second multiplexer. Also, some small increase in the delay encountered by those sources that must go through both multiplexers will occur.

Both of these difficulties can be circumvented by simply increasing the number of basic input channels available. The most significant change is that the counting modulus of counter 42 in the transfer control section (FIG. 4) must be increased from five and made equal to the number of input sources desired plus two. This, then, allows for the generation of a sufficient number of strobing $MC_i$ pulses to accommodate the additional inputs. Additionally, an input channel (FIG. 3) must be provided for each source, and such secondary units as the 4:1 selector 48 (and the transfer clock combining gate 41) in FIG. 4 must be expanded accordingly, as noted earlier.

In the event that the above-noted absolute single channel input rate limitation on the illustrated embodiment of the multiplexer of 461 kbps proves inadequate for certain applications, this limit may readily be increased within the system by replacing the 1 MHz master clock (designated at 38 in FIG. 4) with a 2 MHz clock. This would effectively double both the single channel input rate limit and the output channel rate limit so that inputs of up to 922 kbps and an output as high as 1.9 Mbps could be accommodated.

It will be appreciated by a person having ordinary skill in the art that the proposed multiplexing method may be performed, at least in part, by a properly programmed general-purpose digital computer. For example, the temporary storage function of the input channels 18*a* through 18*n* of FIG. 2 could readily be implemented on such a computer.

Various other modifications, adaptations and alterations are of course possible in light of the above teachings. Therefore, it should be understood at this time that within the scope of the appended claims the invention may be practiced otherwise than as specifically described.

We claim:

1. A method of multiplexing data from a plurality of input data sources each having an associated clock rate, the steps of, storing data from each input source in a first level of storage at the clock rate associated with that source to accumulate a block of data comprising a predetermined number of data bits, generating a master clock signal whose rate is higher than the clock rate associated with any input data source, transferring at said master clock rate each data block accumulated to a second level of storage, appending to each block of data a label uniquely identifying the source of said data, and subsequently transferring each data block and its label out of said second level of storage to a data link for transfer to a receiving station.

2. The data block multiplexing method specified in claim 1 wherein the step of transferring the data block and label from said second level of storage to said data link is performed at a rate determined by that link.

3. The data block multiplexing method specified in claim 1 including the additional steps of sensing the availability of data link capacity in excess of that needed to transfer said block multiplexed data at the rate associated with said data link, and utilizing the sensed excess capacity of said data link to transfer synchronization information and low priority data to the receiving station.

4. The data block multiplexing method specified in claim 1 further including the steps of generating a transfer control signal, and utilizing said transfer control signal to control the order of transfer to said second level of storage of two blocks of data which become available in first storage level for transfer simultaneously.

5. The method specified in claim 4 wherein the step of generating said transfer control signal involves deriving from said master clock signal a sequence of strobing signals, and wherein the step of utilizing said transfer control signal involves the enabling by successive ones of said strobing signals of apparatus effective to cause the selective transfer of data blocks from said first storage level to said second level of storage.

6. The data block multiplexing method specified in claim 5 further including the additional steps of sensing the availability of data link capacity in excess of that needed to transmit said block multiplexed data at the rate associated with said data link, and utilizing the sensed excess capacity of said data link to transfer synchronization information and low priority data to the receiving station.

7. The data block multiplexing method specified in claim 1 wherein the step of storing data from each input source in said first storage level is accomplished by serially shifting the data bits contained in the data from each source into a storage shift register means whose bit storage capacity equals the desired data block length.

8. The data block multiplexing method specified in claim 1 wherein the step of storing data in said first storage level comprises the step of applying data from each input source to an assigned temporary storage at the clock rate associated with that source until a block of data comprising a predetermined number of data bits is accumulated, and wherein the step of transferring data from said first to said second storage level occurs when a block of data has been accumulated in said temporary storage and said second storage level is in a condition to receive and store said data block and its appended label.

9. The data block multiplexing method specified in claim 8 further including the additional step of generating a label uniquely identifying each data source being multiplexed, and appending to each data block accumulated during said temporary data storage step a label uniquely identifying the source of that data prior to transfer of said data block to the second storage level.

10. The block multiplexing method specified in claim 8 further including the steps of generating a transfer control signal in the form of a sequence of strobing pulses, and strobing the temporarily stored data with said transfer control signal to determine the order of transfer to said second level of storage of two blocks of data which become available for transfer simultaneously.

11. The data block multiplexing method specified in claim 8 wherein the temporary storage of data from each input source is accomplished by the steps of applying the data bits comprising each source data to a shift register means having a bit storage capacity corresponding to the predetermined number of data bits in the desired data block length and shifting said data bits within said shift register means by the clock rate associated with that same data source, detecting when said register means has become full, and subsequently shifting control of said full register means to the higher master clock rate for transferring the data from said filled register means to said second storage level.

12. The data block multiplexing method specified in claim 11 wherein, the step of applying source data to a shift register means is accomplished by selectively applying the data from each data source to the empty one of a pair of shift registers each capable of storing said predetermined number of data bits, the step of detecting whenever one of said pair of shift registers has become full is accomplished by counting the clock rate for the same data source during application of data from that source to a shift register, and the step of shifting control of a full shift register in said pair is accomplished by selectively rendering the full shift register effective to transfer its contents to said second storage level at the higher master clock rate.

13. The data block multiplexing method specified in claim 1 further including the step of periodically inserting a block of synchronization information into the data transferred to said data link.

14. The data block multiplexing method specified in claim 13 further including the step of initializing the apparatus to transfer a synchronization block to said data link when said apparatus is initially rendered operative.

15. The data block multiplexing method specified in claim 13 wherein the step of periodically inserting said synchronization block is accomplished by counting the number of data blocks transferred to said second storage level, and rendering effective a source of said synchronization block to transfer a synchronization block to said second storage level each time said predetermined number of data blocks has been transferred to said second storage level.

16. The data block multiplexing method specified in claim 15 further including the additional steps of sensing the availability of data link capacity in excess of that needed to transfer said block multiplexed data and said periodic synchronization block at the rate associated with said data link, and applying synchronization and low priority data to said data link in the presence of sensed excess data link capacity.

17. The data block multiplexing method specified in claim 16 wherein the step of storing source data in said first storage level is accomplished by the selective application of data from each source to an associated one of a plurality of input channels each containing means to store the data from the associated data source, and further including the step of sequentially strobing the input storage channels to determine the time sequence in which the data stored in each channel is transferred to said second level of storage.

18. The data block multiplexing method specified in claim 17 further including the steps of generating a label uniquely identifying each input data source, and appending to each block of data accumulated in one of said input channels the appropriate label associated with the source of that data prior to transferring said data to said second level of storage.

19. In a data transfer system including a fixed capacity data link for transferring block multiplexed data at a predetermined rate from a plurality of data sources to a reception station, the method comprising the steps of sensing the availability of data link capacity in excess of that needed to transfer said block multiplexed data at the transfer rate for said link, and utilizing the sensed excess capacity of said data link to transfer synchronization information and low priority data to the reception station.

20. The method specified in claim 19 wherein the data transfer system comprises a first storage level for temporarily storing data from each of a plurality of data sources at the clock rate for that source until a block of data containing a predetermined number of data bits has been accumulated from a particular source, and a second level of storage to which each data block is transferred after being accumulated in said first storage level and from which said data blocks are read out to the data link at the clock rate for the data link, and wherein the step of sensing the availability of excess data link capacity is accomplished by the steps of, registering a first count of the number of data blocks transferred from said first to said second storage level, registering a second count of the number of data blocks read out from said second storage level to said data link, comparing said first and second counts to obtain an indication of when said data link is in condition to receive a data block and no data block is contained in said second storage level, and transferring a block of synchronization information and low priority data to said second storage level when said comparison step provides said indication.

21. The method specified in claim 20 further including the step of initializing the apparatus which registers said first and second counts so that a synchronization block is transferred to said data link when the data block transfer system is initially rendered operative.

22. Apparatus for multiplexing data from a plurality of input data sources each having an associated clock rate onto a data link, comprising, first storage means constituting a first level of storage for storing data from each input data source at the clock rate associated with that source to accumulate a block of data comprising a predetermined number of data bits, means for generating a master clock signal whose rate is higher than the clock rate associated with any of said input data sources, second storage means constituting a second level of storage, means operably connected between said first and second storage means and responsive to the master clock signal generated by said generating means for transferring each data block accumulated from said first storage means to said second storage means at said master clock signal rate, means for appending to each block of data a label uniquely identifying the source of said data block, and means operably connecting said second storage means to said data link for reading the data blocks and appended labels out of said second storage means and onto said data link at a rate determined by said data link, for transfer to a receiving station.

23. The data block multiplexer specified in claim 22 further including means responsive to the condition of said data link for sensing the availability of data link capacity in excess of that needed to transfer said block multiplexed data, source means for producing synchronization information and low priority data, and means responsive to said sensing means for transferring synchronization information and low priority data from said source means to said second storage means when said sensing means senses said excess data link capacity.

24. The data block multiplexer specified in claim 22 further including means for generating a transfer control signal, and control means responsive to said transfer control signal for controlling the order of transfer to said second level of storage of two blocks of data which become available in said first storage means for transfer simultaneously.

25. The data block multiplexer specified in claim 24 wherein said transfer control signal generating means includes means responsive to said master clock signal for deriving from said master clock signal a sequence of strobing signals, and said control means includes means for selectively applying successive ones of said strobing signals to said first storage means to cause the sequential transfer of data blocks accumulated for said plurality of input data sources from said first storage means to said second storage means.

26. The data block multiplexer specified in claim 25 further including means responsive to the condition of said data link for sensing the availability of data link capacity in excess of that needed to transfer said block multiplexed data, source means for producing synchronization information and low priority data, and means responsive to said sensing means for transferring synchronization information and low priority data from said source means to said second storage means when said sensing means senses said excess data link capacity.

27. The data block multiplexer specified in claim 22 wherein said first storage means comprises a plurality shift register means each operably connected to an associated one of said input data sources and each having a bit storage capacity equal to the desired data block length, the input data bits from each input data source being serially shifted into the associated shift register means at the clock rate associated with that same input data source.

28. The data block multiplexer specified in claim 22 wherein said first storage means comprises a plurality of temporary storage means each adapted to receive data from an associated input data source at the clock rate associated with that same input data source until a block of data comprising a predetermined number of data bits has been accumulated, and wherein said transfer means is rendered effective to transfer a block of data from said first storage means to said second storage means when a block of data has been accumulated in one of said temporary storage means and said second storage means is in a condition to receive and store said data block.

29. The data block multiplexer specified in claim 28 wherein said appending means comprises means for generating a label uniquely identifying each data source being multiplexed, each label being appended to data from the associated source when a block of such data has been accumulated within said first storage means and prior to transfer of said data block to said second storage means.

30. The data block multiplexer specified in claim 28 further including, means for generating a transfer control signal in the form of a sequence of strobing pulses, and means for sequentially applying said strobing pulses to different ones of said temporary storage means to determine the order of transfer of blocks of data from said temporary storage means to said second storage means.

31. The data block multiplexer specified in claim 28 wherein, said temporary storage means for each data source comprises a shift register means having a bit storage capacity corresponding to the predetermined number of data bits in the desired data block length and adapted to have said data bits shifted thereinto by the clock rate associated with that same data source, and wherein said transfer means includes means for detecting when a shift register means has become full with a block of data from the associated data source and for thereafter causing the data block to be transferred from said full shift register means to said second storage means at said master clock rate.

32. The data block multiplexer specified in claim 31 wherein said shift register means associated with each data source comprises a pair of shift registers each capable of storing said predetermined number of data bits, and further including means for detecting whenever one of said pair of shift registers for a particular data source has become full with data from said source by counting the clock rate for that data source during application of data from said source to a shift register, first selector means responsive to said detecting means for selectively connecting the empty one of said pair of shift registers to said data source whenever the other register has been detected as being full with data, and second selector means responsive to said detecting means for selectively connecting the full shift register in said shift register pair to transfer its contents to said second storage means at said master clock rate.

33. The data block multiplexer specified in claim 22 further including a source of synchronization information, and means responsive to the number of data blocks transferred to said second storage means from said first storage means for rendering said synchronization source effective to transfer a block of synchronization information to said second storage means each time a predetermined number of data blocks has been transferred from said first storage means to said second storage means.

34. The data block multiplexer specified in claim 33 further including means for initializing said block multiplexer to transfer a synchronization block to said second storage means when said block multiplexer is initially rendered operative.

35. The data block multiplexer specified in claim 33 further including, means for sensing the availability of data link capacity in excess of that needed to transfer said block multiplexed data and said periodic synchronization block at the rate associated with said data link, and means for applying synchronization and low priority data to said data link in the presence of said sensed excess data link capacity.

36. The data block multiplexer specified in claim 35 wherein, said first storage means comprises a plurality of input data storage channels each adapted to receive and store a block of data from an associated data source, and further including means for sequentially strobing said input storage channels to determine the time sequence in which data stored in said input data channels are transferred to said second storage means.

37. The data block multiplexer specified in claim 36 further including means connected to each input data storage channel for generating and appending to each block of data a label uniquely identifying the source of said data block prior to transfer of said data block to said second storage means.

38. In combination with a data block multiplexer connected to a data communications link of fixed capacity, means for sensing the availability of data link capacity in excess of that needed to transmit block multiplexed data at the clock rate for said data link, and means responsive to said sensing means for enabling the transfer of synchronization information and low priority data to said data link for transmission to a reception station.

39. The combination specified in claim 38 wherein said data block multiplexer includes, first storage means for temporarily storing data from each of a plurality of input data sources at the clock rate for that source until a block of data containing a predetermined number of data bits has been accumulated from a particular source, and a second storage means to which said data block is transferred after being accumulated in said first storage means and from which said data blocks are read out onto said data link at the clock rate for data link, and wherein said means for sensing the availability of excess data link capacity comprises, means for registering a first count of the number of data blocks transferred from said first storage means to said second storage means within said data block multiplexer, means for registering a second count of the number of data blocks read out from said second storage means onto said data link, comparator means for comparing said first and second counts to obtain an indication of when said data link is in a condition to receive a data block and no data block is contained in said second storage means, and means for transferring a block of synchronization information and low priority data to said second storage means when said comparator provides said indication.

40. The combination specified in claim 39 further including means for initializing said first and second count registering means to register a count condition wherein synchronization information is transferred to said data link when said data block multiplexer is initially rendered operative.

* * * * *